United States Patent
Suzuki et al.

(10) Patent No.: US 8,294,399 B2
(45) Date of Patent: Oct. 23, 2012

(54) MOTOR CONTROLLER AND ELECTRIC TOOL HAVING THE SAME

(75) Inventors: Jiro Suzuki, Anjo (JP); Takuya Kusakawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 319 days.

(21) Appl. No.: 12/734,645

(22) PCT Filed: Dec. 1, 2008

(86) PCT No.: PCT/JP2008/071779
§ 371 (c)(1),
(2), (4) Date: May 13, 2010

(87) PCT Pub. No.: WO2009/087834
PCT Pub. Date: Jul. 16, 2009

(65) Prior Publication Data
US 2010/0308764 A1      Dec. 9, 2010

(30) Foreign Application Priority Data
Jan. 8, 2008   (JP) ................................. 2008-000977

(51) Int. Cl.
| | |
|---|---|
| H02P 1/04 | (2006.01) |
| H02P 1/24 | (2006.01) |
| H02P 25/14 | (2006.01) |
| H02P 7/06 | (2006.01) |
| H02P 6/00 | (2006.01) |
| E21B 15/04 | (2006.01) |
| E21B 3/00 | (2006.01) |
| B25D 13/00 | (2006.01) |

(52) U.S. Cl. .................. 318/400.17; 318/244; 318/245; 318/246; 318/400.01; 318/461; 318/474; 318/721; 173/2; 173/200; 173/217

(58) Field of Classification Search ............. 318/400.01, 318/400.17, 244, 245, 246, 461, 474, 721; 173/2, 200, 217
See application file for complete search history.

(56) References Cited

U.S. PATENT DOCUMENTS
4,550,277 A    10/1985   Carney
(Continued)

FOREIGN PATENT DOCUMENTS
JP      A-8-149878      6/1996
(Continued)

OTHER PUBLICATIONS
International Search Report issued in International Application No. PCT/JP2008/071779 on Feb. 24, 2009 (with English-language translation).
(Continued)

Primary Examiner — Walter Benson
Assistant Examiner — Gabriel Agared
(74) Attorney, Agent, or Firm — Oliff & Berridge, PLC (57) ABSTRACT

A motor controller comprises a processor selectively outputting an on-signal to either one of an upper arm switching element and a lower arm switching element based upon a detected position by the position sensor, gate drivers inputting a driving voltage to the gates of the switching elements by shifting a level of the on-signal from the processor to the upper arm switching element and a bootstrap capacitor configured to be charged while the upper arm switching element is turned off and to behave as a voltage supply for the gate driver while the upper arm switching element is turned on. The processor is configured to reduce a set duty ratio when the set duty ratio is equal to or larger than a predetermined value (e.g. 80 percents) and a rotational position of the motor does not change for a first predetermined time. This motor controller can prevent the switching element from a burnout even if the motor is locked.

9 Claims, 8 Drawing Sheets

U.S. PATENT DOCUMENTS

| | | | |
|---|---|---|---|
| 6,771,043 B2 * | 8/2004 | Matsunaga et al. | 320/114 |
| 8,067,913 B2 * | 11/2011 | Watabe et al. | 318/446 |
| 2007/0024218 A1 | 2/2007 | Nagai | |
| 2007/0247097 A1 * | 10/2007 | Seiler et al. | 318/432 |
| 2009/0115362 A1 * | 5/2009 | Saha et al. | 318/400.09 |
| 2009/0195197 A1 * | 8/2009 | Nishimura et al. | 318/400.09 |
| 2010/0117581 A1 * | 5/2010 | Miwa et al. | 318/472 |
| 2011/0073334 A1 * | 3/2011 | Iimura et al. | 173/2 |

FOREIGN PATENT DOCUMENTS

| | | |
|---|---|---|
| JP | A-11-122703 | 4/1999 |
| JP | A-11-252970 | 9/1999 |
| JP | A-2003-009573 | 1/2003 |
| JP | A-2003-305667 | 10/2003 |
| JP | A-2004-201453 | 7/2004 |
| JP | A-2005-245075 | 9/2005 |
| JP | A-2007-068393 | 3/2007 |
| JP | A-2007-196363 | 8/2007 |

OTHER PUBLICATIONS

Apr. 3, 2012 Russian Office Action issued in Russian Patent Application No. 2010133155/07 (with translation).

Japanese Office Action issued on Jun. 12, 2012 for Japanese patent application No. 2008-000977 (with translation).

Aug. 9, 2012 Office Action issued in European Application No. 08870429.1.

* cited by examiner

MOTOR CONTROLLER AND ELECTRIC TOOL HAVING THE SAME

TECHNICAL FIELD

This application claims priority to Japanese Patent Application No. 2008-000977 filed on Jan. 8, 2008, the contents of which are hereby incorporated by reference into the present application.

The present invention relates to a motor controller, and more particularly to a controller that drives switching elements configured to connect and disconnect a brushless motor and a DC power supply by a bootstrap-type driver.

DESCRIPTION OF RELATED ART

Japanese Patent Application Publication No. 2004-201453 discloses a controller for a brushless motor. This controller includes a position sensor detecting a rotational position of a motor, an upper arm switching element including a gate to be driven and configured to connect and disconnect a corresponding terminal of the motor and a positive electrode of a DC power supply, a lower arm switching element including a gate to be driven and configured to connect and disconnect the corresponding terminal of the motor and a negative electrode of the DC power supply, a processor selectively outputting an on-signal to the upper arm switching element and the lower arm switching element, an upper arm gate driver applying a driving voltage to the gate of the upper arm switching element by shifting a level of the on-signal from the processor to the upper arm switching element, a lower arm gate driver applying a driving voltage to the gate of the lower arm switching element by shifting the level of the on-signal from the processor to the lower arm switching element, and a bootstrap capacitor configured to be charged while the upper arm switching element is turned off and to behave as a voltage supply for the upper arm gate driving circuit while the upper arm switching element is turned on. The aforementioned processor includes a process portion setting a duty ratio based upon a target speed of rotation of the motor and a process portion modulating width of the outputted on-signal based upon the set duty ratio and adjusts the rotation speed of the motor.

DISCLOSURE OF THE INVENTION

Problem to be Solved by the Invention

In the above-described motor controller, when the motor is locked by a mechanical lock or an overload, the upper arm switching elements remain switched on. Therefore, the discharge of the bootstrap capacitor advances and the voltage thereof drops. Where the voltage of the bootstrap capacitor drops, a sufficient driving voltage cannot be applied to the upper arm switching element. In this case, the ON resistance of the upper arm switching element rises abruptly and the upper arm switching element can be burned by the heat generated therein.

With the foregoing in view, it is an object of the present invention to provide a motor controller that prevents the switching element from burning even when the motor is locked.

Means to Solve the Problem

A motor controller implemented in accordance with the present invention includes: a position sensor detecting a rotational position of a motor; an upper arm switching element including a gate to be driven and configured to connect and disconnect a corresponding terminal of the motor and a positive electrode of a DC power supply; a lower arm switching element including a gate to be driven and configured to connect and disconnect the corresponding terminal of the motor and a negative electrode of the DC power supply; a processor selectively outputting an on-signal to either one of the upper arm switching element and the lower arm switching element based upon a detected position by the position sensor; an upper arm gate driver inputting a driving voltage to the gate of the upper arm switching element by shifting a level of the on-signal from the processor to the upper arm switching element; a lower arm gate driver inputting a driving voltage to the gate of the lower arm switching element by shifting the level of the on-signal from the processor to the lower arm switching element; and a bootstrap capacitor configured to be charged while the upper arm switching element is turned off and to behave as a voltage supply for the upper arm gate driving circuit while the upper arm switching element is turned on.

The processor includes: a setting process portion setting a duty ratio based upon a target speed of rotation of the motor; a PWM process portion modulating width of the on-signal based upon the set duty ratio; and a timer process portion timing an interval of update of the detected position by the position sensor. The setting process portion reduces the set duty ratio when the set duty ratio is equal to or larger than a predetermined value (e.g., 80 percent) and the timed interval by the timer process portion exceeds a first predetermined time.

With such a controller, when the motor is locked e.g., by a mechanical lock or an overload, the upper arm switching element is intermittently switched off even when the target rotation speed is set to a maximum. By intermittently switching off the upper arm switching element, the voltage drop caused by the discharge of the bootstrap capacitor is prevented and a sufficient driving voltage is continuously supplied to the upper arm switching element. As a result, the upper arm switching element is prevented from burning.

The setting process portion of the processor preferably reduces the set duty ratio by an amount between 10 to 50 percent in reducing the set duty ratio as aforestated. As a result, the decrease in voltage caused by the discharge of the bootstrap capacitor can be prevented without unnecessarily excessively reducing the motor output.

The setting process portion of the processor preferably resets the duty ratio based upon the target speed of rotation of the motor when the timed interval by the timer process portion becomes shorter than the first predetermined time after having reduced the set duty ratio. With such a motor controller, the rotation speed of the motor can be rapidly restored to the target rotation speed when the mechanical lock or overload is removed and the motor restarts rotation.

The setting process portion preferably sets the duty ratio to zero percent when the timed interval by the timer process portion exceeds a second predetermined time, which is longer than the first predetermined time, after having reduced the set duty ratio. As a result, it is possible to avoid continuously supplying unnecessary power to a motor that had become unable to rotate due to a mechanical lock or an overload.

Effect of the Invention

The present invention makes it possible to realize a motor controller that prevents the switching elements from burning even when the motor is locked.

PREFERRED EMBODIMENT OF THE INVENTION

First, preferred features of an embodiment will be described.
(Feature 1) A motor that is a control object is preferably a DC three-phase brushless motor.
(Feature 2) A switching element preferably uses an n-channel insulated gate field-effect transistor (n-MOSFET) or an insulated gate bipolar transistor (IGBT).
(Feature 3) A motor controller is preferably provided with a set unit setting a target rotation speed.
Embodiment An electric driver 10 in accordance with the present invention will be described below with reference to the appended drawings. The eclectic driver 10 is an electric tool that is used for tightening screws and the like. The electric driver 10 of the present embodiment is of an impact system (electric impact driver).

Figure 1:
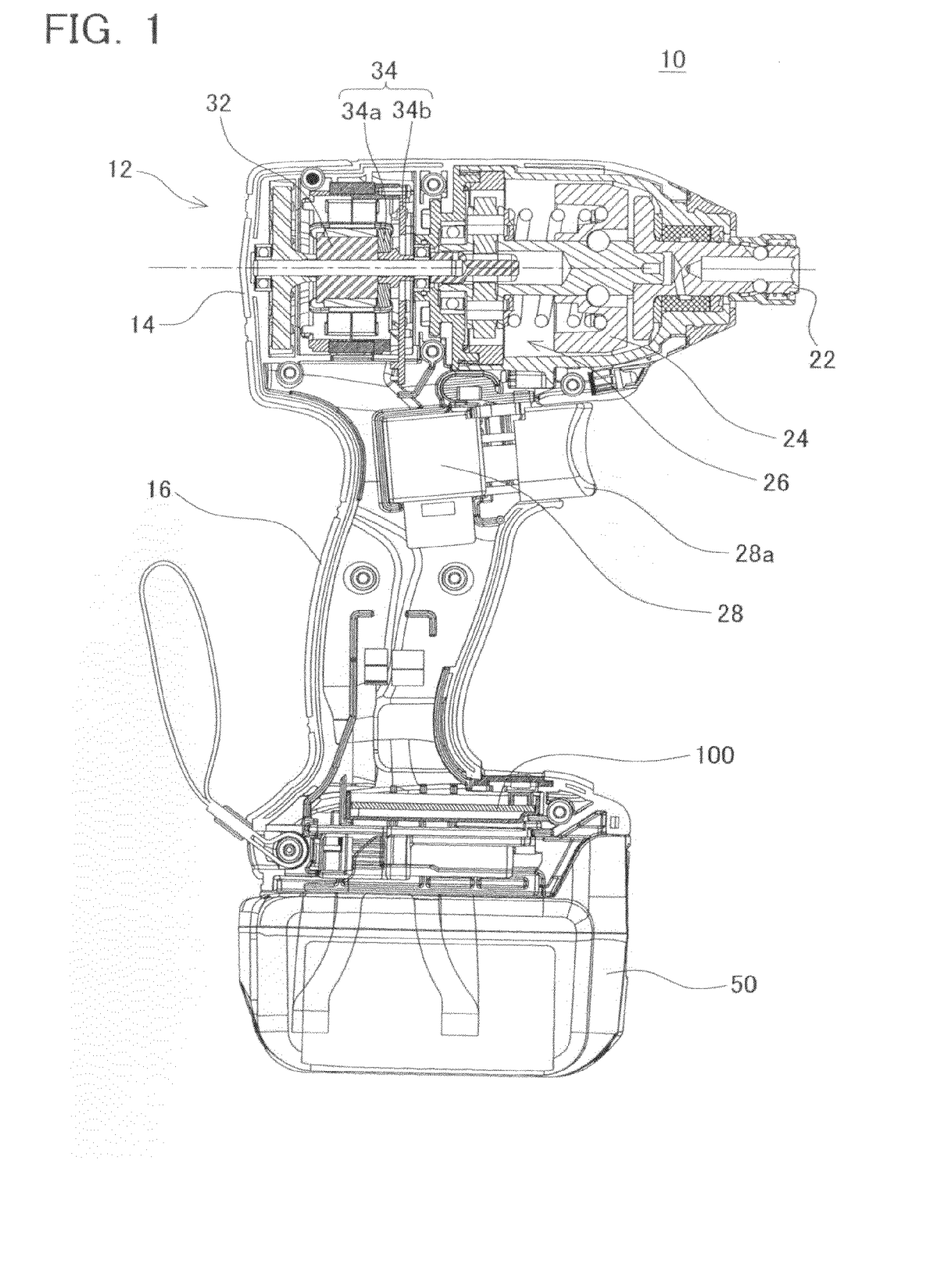
FIG. 1 is a side sectional view of an electric driver.

FIG. 1 is a side sectional view illustrating the configuration of the electric driver 10. As shown in FIG. 1, the electric driver 10 is provided with a main body 12 and a battery pack 50 detachably attached to the main body 12. The main body 12 generally includes an almost cylindrical body portion 14 and a grip portion 16 extending sidewise of the body portion 14. The battery pack 50 is mounted on the distal end of the grip portion 16.

A rotatably supported tool chuck 22, an impact mechanism 24 connected to the tool chuck 22, a reducer 26 connected to the impact mechanism 24, and a motor 32 connected to the reducer 26 are incorporated in the body portion 14 of the main body 12. The tool chuck 22 is configured to protrude from one end of the body portion 14 (right side in FIG. 1) and to be capable of receiving a driver bit (not shown in the figure). The motor 32 is connected to the tool chuck 22, with the reducer 26 and the impact mechanism 24 being interposed therebetween, and rotates the tool chuck 22 with the driver bit mounted thereon. In this case, the rotation torque of the motor 32 is amplified by the reducer 26. The motor 32 is a DC three-phase brushless motor.

A position sensor 34 detecting a rotational position of the motor 32 is provided in the body portion 14 of the main body 12. The position sensor 34 is provided with a plurality of magnets 34a fixed to the motor 32 and a sensor substrate 34b fixed to the main body 12 side. A plurality of Hall elements detecting approach/withdrawal of the magnet 34a is provided at the sensor substrate 34b. The magnets 34a repeat approach/withdrawal movements, following the rotation of the motor 32, with respect to each Hall element of the sensor substrate 34b. The position sensor 34 updates and outputs a detection signal (referred to herein as Hall signal HS) indicating the rotational position of the motor 32 each time the motor 32 rotates through a predetermined rotation angle.

The grip portion 16 of the main body 12 is provided with a trigger switch 28 operated by the user and a controller 100 controlling the operation of the motor 32 in response to the operation applied to the trigger switch 28. The trigger switch 28 is an operation portion for starting/stopping the motor 32 and also an operation portion for adjusting the rotation speed of the motor 32. Where the user operates a trigger member 28a of the trigger switch 28, the motor 32 starts rotating, and where the user releases the trigger member 28a, the rotation of the motor 32 is stopped. Where the operation level of the trigger member 28a by the user is high, the motor 32 rotates at a high speed, and where the operation level of the trigger member 28a by the user is low, the motor 32 rotates at a low speed.

Figure 2:
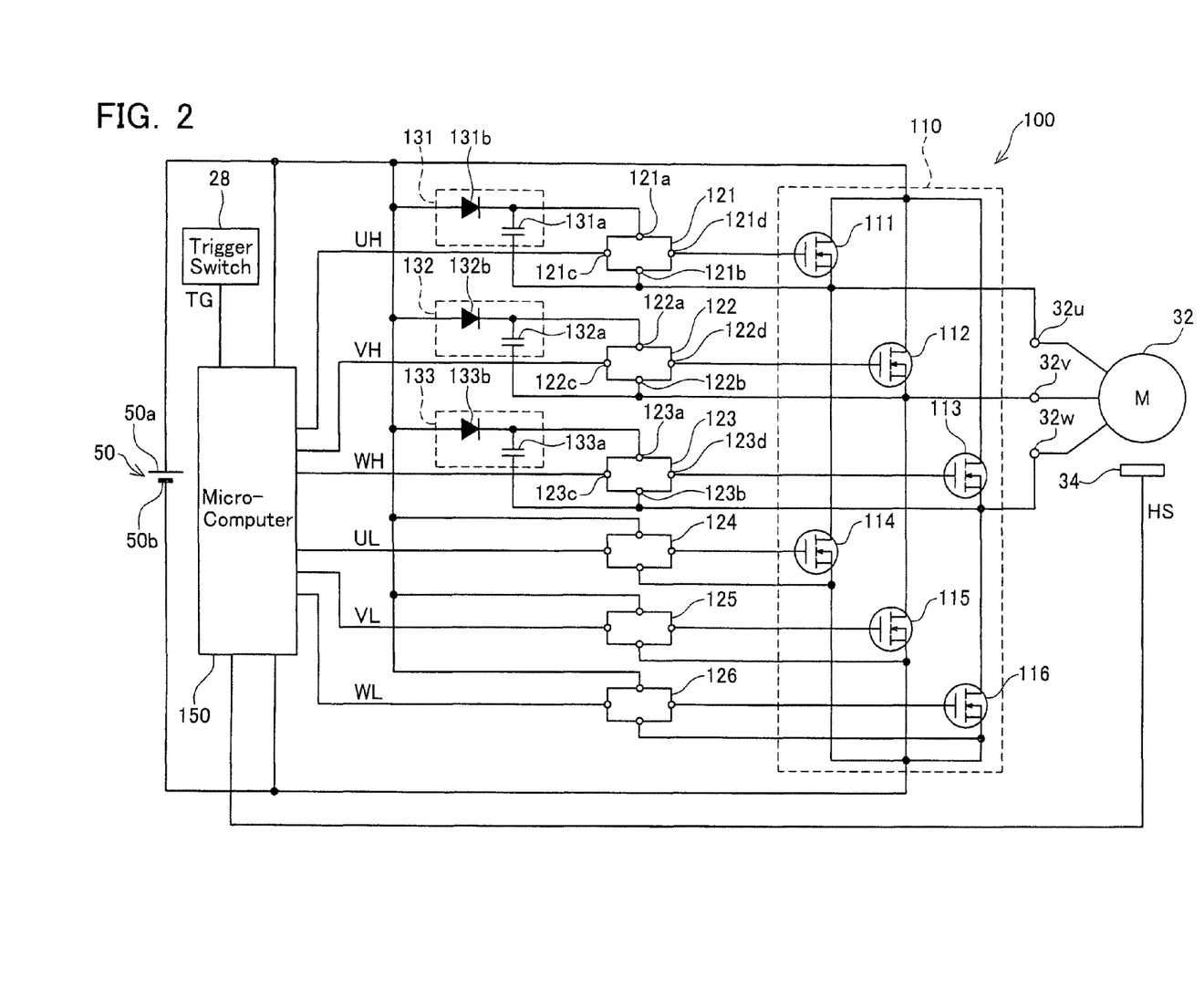
FIG. 2 shows an electric configuration of the electric driver.

FIG. 2 shows an electric configuration of the electric driver 10. As shown in FIG. 2, in the electric driver 10, the motor 32 and the battery pack 50 are connected by the controller 100. The controller 100 is provided with a motor driver 110 electrically connecting the motor 32 and the battery pack 50. The motor driver 110 is provided with a first switching element 111 configured to connect and disconnect a U-phase terminal 32u of the motor 32 and a positive electrode 50a of the battery pack 50, a second switching element 112 configured to connect and disconnect a V-phase terminal 32v of the motor 32 and the positive electrode 50a of the battery pack 50, a third switching element 113 configured to connect and disconnect a W-phase terminal 32w of the motor 32 and the positive electrode 50a of the battery pack 50, a fourth switching element 114 configured to connect and disconnect the U-phase terminal 32u of the motor 32 and a negative electrode 50b of the battery pack 50, a fifth switching element 115 configured to connect and disconnect the V-phase terminal 32v of the motor 32 and the negative electrode 50b of the battery pack 50, and a sixth switching element 116 configured to connect and disconnect the W-phase terminal 32w of the motor 32 and the negative electrode 50b of the battery pack 50. These switching elements 111 to 116 are n-channel field effect transistors (MOSFET). Another type of semiconductor switching elements having a driven gate, for example an insulated-gate bipolar transistor (IGBT), can be also used for the switching elements 111 to 116.

In the present description, the first switching element 111, second switching element 112, and third switching element 113 configured to connect and disconnect the terminals 32u, 32v, 32w of the motor 32 and the positive electrode of the battery pack 50 will be generally referred to as upper arm switching elements 111 to 113, and the fourth switching element 114, fifth switching element 115, and sixth switching element 116 configured to connect and disconnect the terminals 32u, 32v, 32w of the motor 32 and the negative electrode of the battery pack 50 will be generally referred to as lower arm switching elements 114 to 116.

The controller 100 is provided with a microcomputer 150. The trigger switch 28 and the position sensor 34 are connected to the microcomputer 150, a trigger signal TG is inputted from the trigger switch 28, and a Hall signal HS is inputted from the position sensor 34. The trigger signal TG as referred to herein is a voltage signal that is outputted from the trigger switch 28 and fluctuates correspondingly to the operation amount of the trigger member 28a. Thus, the trigger signal TG indicates the target rotation speed of the motor 32 that is desired by the user. The microcomputer 150 selectively outputs on-signals UH, VH, WH, UL, VL, and WL to the switching elements 111 to 116 on the basis of the trigger signal TG and Hall signal HS. The microcomputer 150 will be explained below in greater detail.

The controller 100 is provided with six gate drivers 121 to 126 that respectively drive the switching elements 111 to 116 of the motor driver 110. The gate drivers 121 to 126 shift the levels of on-signals UH, VH, WH, UL, VL, and WL from the microcomputer 150 to the switching elements 111 to 116, respectively, and apply the drive voltage to the gates of the switching elements 111 to 116. These six gate drivers 121 to 126 are level shift circuits having identical structure. For example, the gate driver 121 for the first switching element 111 inputs a binary voltage signal from a signal input terminal 121c and outputs from a signal output terminal 121d a fluctuating binary voltage signal that varies according to a voltage between the first voltage input terminal 121a and a second voltage input terminal 121b. As shown in FIG. 2, the first voltage input terminal 121a is connected to the positive electrode 50a of the battery pack 50, and the second voltage input terminal 121b is connected to a source of the first switching element 111. Other gate drivers 122 to 126 have similar configurations and functions and are similarly provided for the switching elements 112 to 116, respectively.

As shown in FIG. 2, bootstrap circuits 131 to 133 are provided for the gate drivers 121 to 123 for the upper arm switching elements 111 to 113, respectively. The bootstrap circuits 131 to 133 have bootstrap capacitors 131a to 133a and diodes 131b to 133b, respectively. The bootstrap capacitors 131a to 133a are connected between the first voltage input terminals 121a to 123a and second voltage input terminals 121b to 123b of the gate drivers 121 to 123, respectively. The diodes 131b to 133b are introduced between the positive electrode 50a of the battery pack 50 and the bootstrap capacitors 131a to 133a, respectively. The diodes 131b to 133b are provided in positions that do not intervene between the bootstrap capacitors 131a to 133a and first voltage input terminals 121a to 123a of the gate drivers 121 to 123, respectively. The bootstrap capacitors 131a to 133a are charged when the corresponding upper arm switching elements 111 to 113 are off and function as a power source of the gate drivers 121 to 123 when the corresponding upper arm switching elements 111 to 113 are on. Thus, when the upper arm switching elements 111 to 113 are on, the voltage of the first voltage input terminals 121a to 123a of the gate drivers 121 to 123 is raised to be higher than that of the positive electrode 50a of the battery pack 50. As a result, when the upper arm switching elements 111 to 113 are on, a sufficient driving voltage is applied to the gate of the upper arm switching elements 111 to 113.

Figure 3:
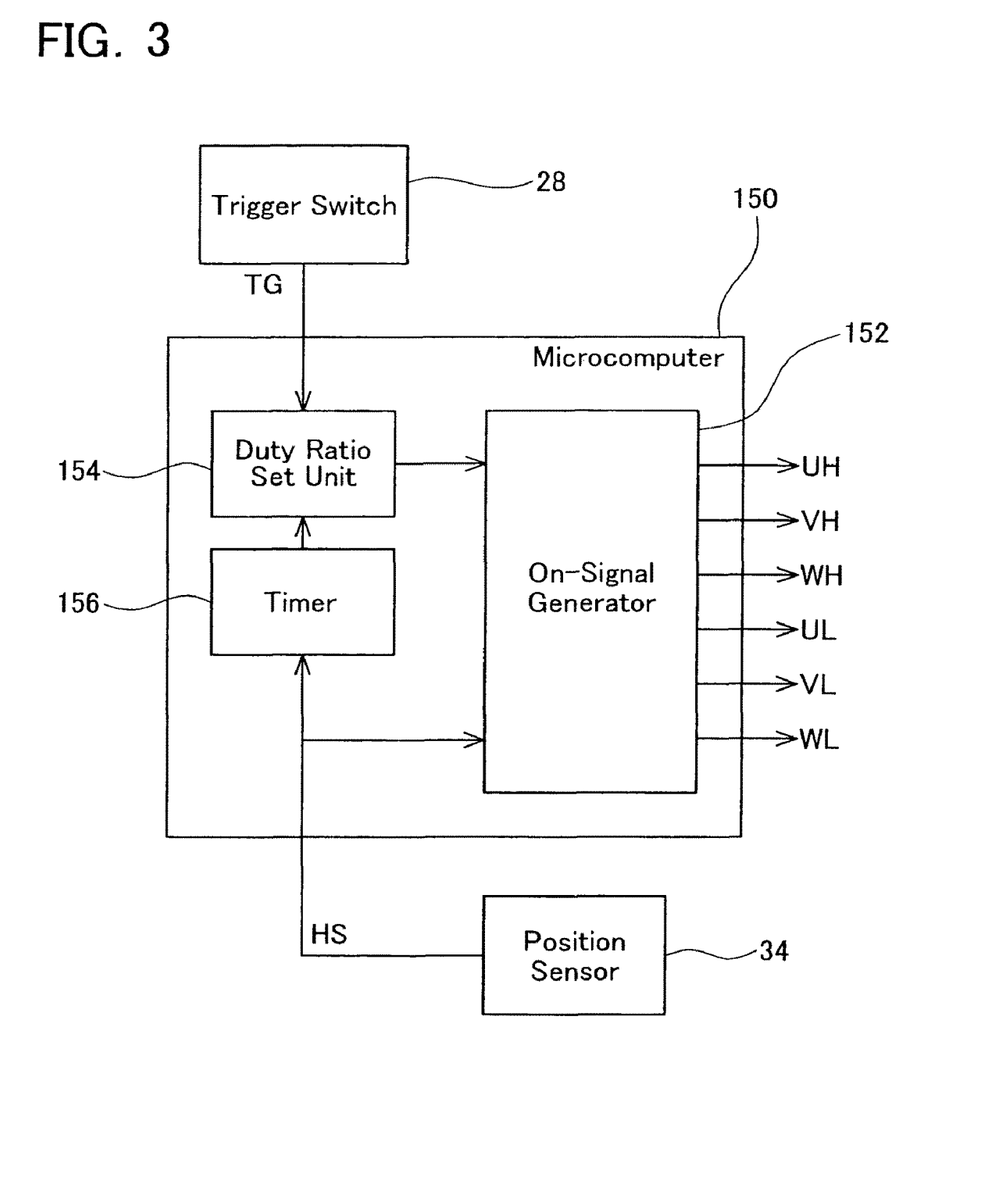
FIG. 3 is a block diagram illustrating a functional configuration of the microcomputer.
Figure 4:
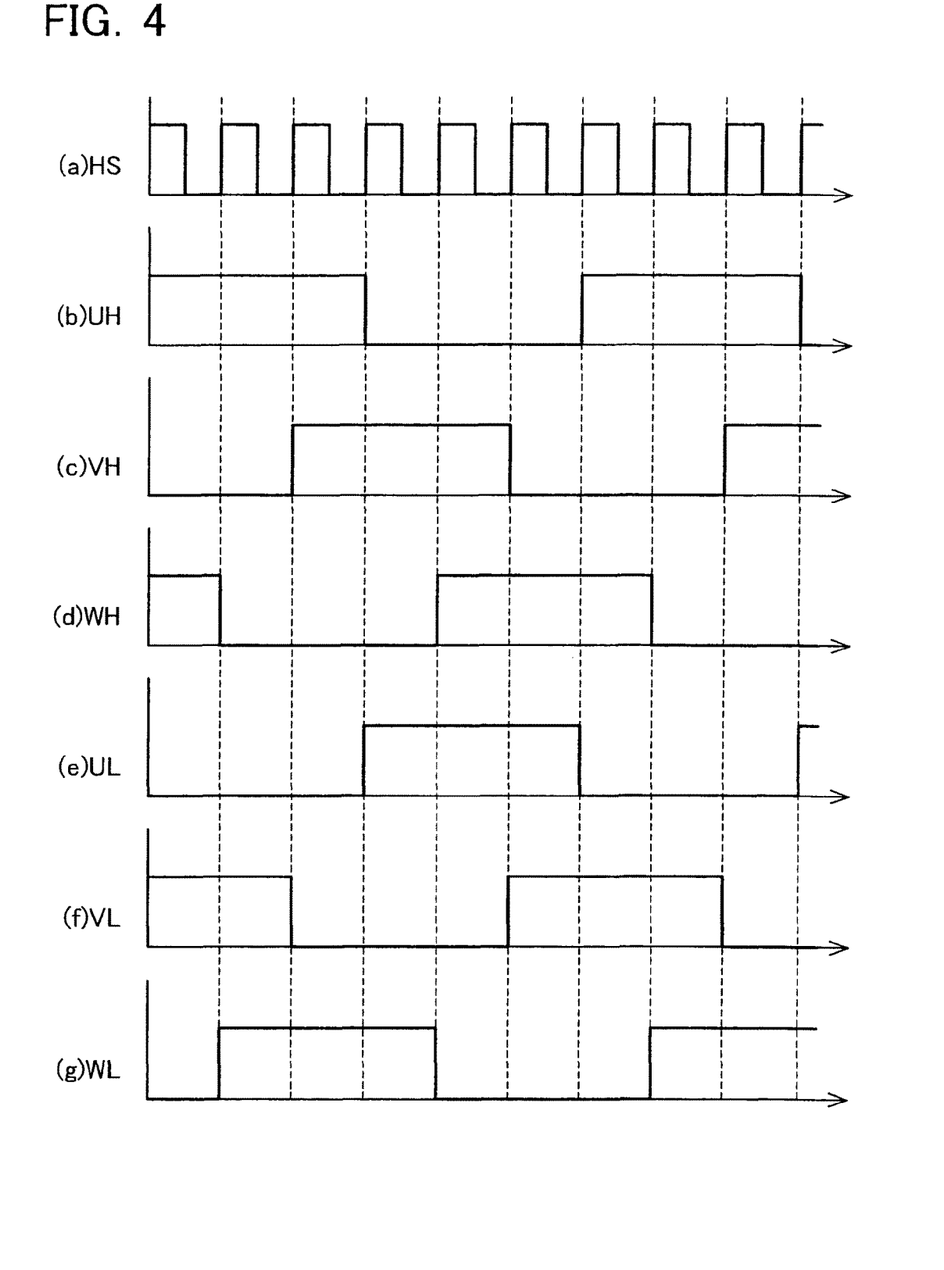
FIG. 4 is a time chart illustrating the relationship between a Hall signal and an on-signal (duty ratio is 100 percent).
Figure 5:
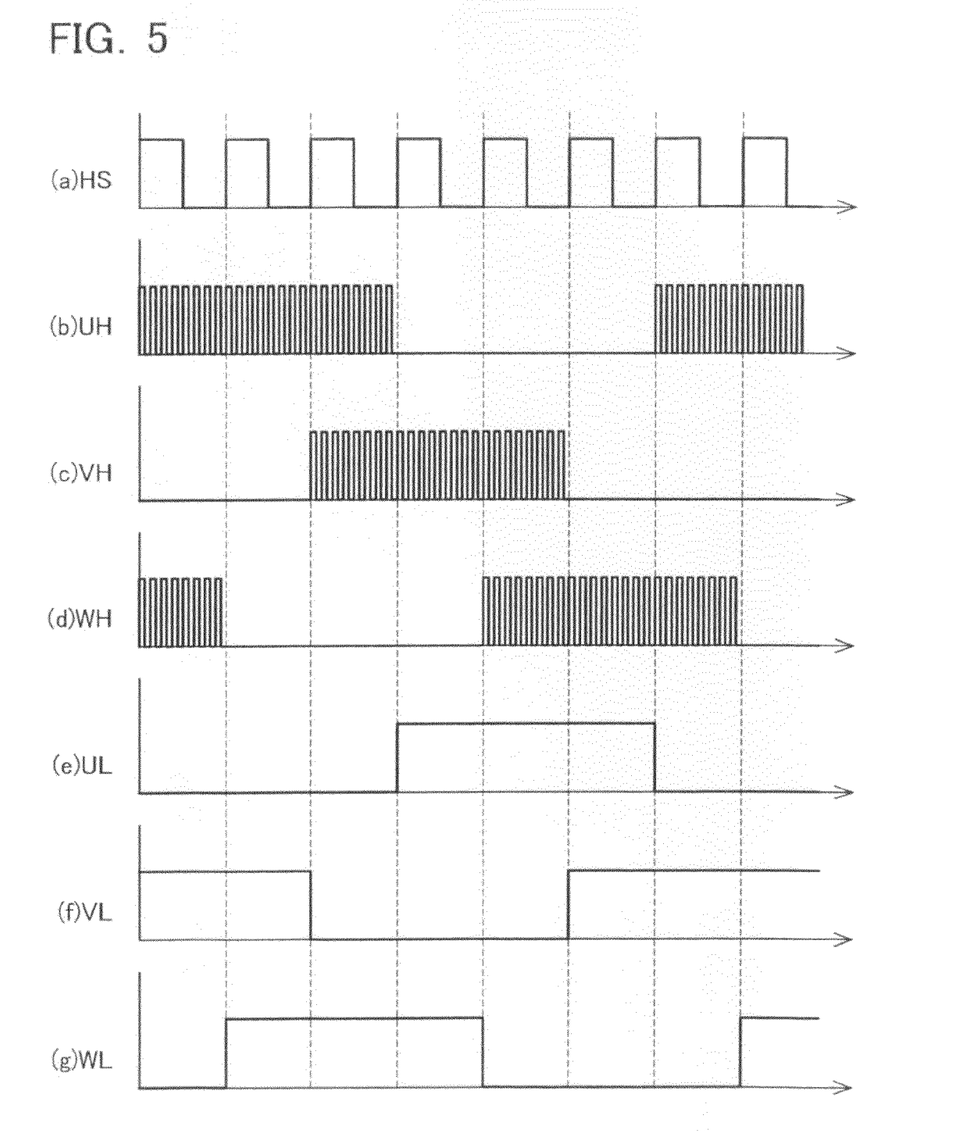
FIG. 5 is a time chart illustrating the relationship between a Hall signal and an on-signal (duty ratio is 50 percent).

The microcomputer 150 will be described below. FIG. 3 is a block diagram illustrating a functional configuration of the microcomputer 150. As shown in FIG. 3, functionally, the microcomputer 150 is composed of an on-signal generator 152, a duty ratio set unit 154, and a timer 156. The on-signal generator 152 generates on-signals UH, VH, WH, UL, VL, and WL to the switching elements 111 to 116 respectively on the basis of Hall signals HS from the position sensor 34. FIG. 4 shows a relationship between the updating timing Hall signals HS by the position sensor 34 and the on-signals UH, VH, WH, UL, VL, and WL generated by the on-signal generator 152. Further, as shown in FIG. 5, the on-signal generator 152 can modulate the width of on-signals UH, VH, WH outputted to the upper arm switching elements 111 to 113, on the basis of a duty ratio set by the duty ratio set unit 154. As a result, the rotation speed of the motor 32 is adjusted.

Figure 6:
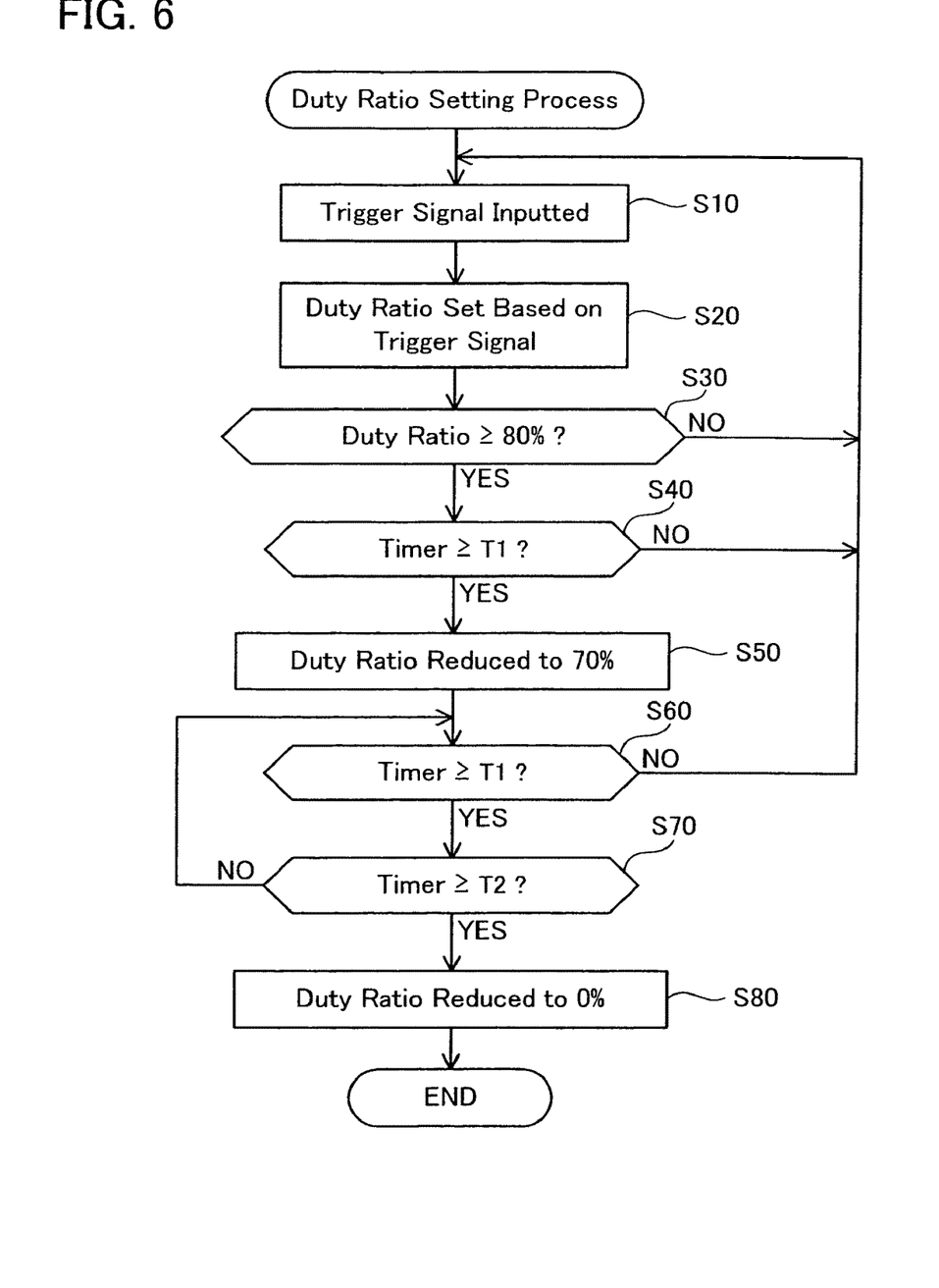
FIG. 6 is a flowchart illustrating a process of setting the duty ratio.

The duty ratio set unit 154 sets the aforementioned duty ratio on the basis of a trigger signal TG from the trigger switch 28. Further, the set duty ratio is adjusted by increasing and reducing on the basis of the timed interval by the timer 156. In this case, the timer 156 inputs a Hall signal HS outputted from the position sensor 34 and measures the timed interval in which the Hall signal HS is updated. The timed interval by the timer 156 increases with the decrease in rotation speed of the motor 32. When the timed interval by the timer 156 is extremely long, it can be assumed that the motor 32 is locked by a mechanical lock or an overload. FIG. 6 is a flowchart illustrating the flow of process by which the duty ratio set unit 154 sets the duty ratio. The duty ratio set unit 154 executes the process flow shown in FIG. 6, while the user operates the trigger switch 28.

First, in step S10, the duty ratio set unit 154 inputs a trigger signal TG from the trigger switch 28. Then, in step S20, the duty ratio set unit 154 sets a duty ratio on the basis of the inputted trigger signal TG. In step S30, the duty ratio set unit 154 advances to the processing of step S40 if the set duty ratio is equal to or larger than 80 percent and returns to the processing of step S10 if the set duty ratio is not equal to or larger than 80 percent. Thus, where the set duty ratio is not equal to or larger than 80 percent, the setting of duty ratio is repeatedly conducted in response to the trigger signal TG inputted from the trigger switch 28. In this case, the determination criterion relating to a duty ratio of equal to or larger than 80 percent is stored in advance in the duty ratio set unit 154 as a duty ratio range in which the upper arm switching elements 111 to 113 can be burned. The determination criterion relating to a duty ratio is not limited to a value of equal to or larger than 80 percent, as in the present embodiment, and may be appropriately set correspondingly to the configuration of the electric tool 10. When the processing advances to step S40, the duty ratio set unit 154 confirms the timed interval by the timer 156. If the timed interval by the timer 156 is equal to or longer than a first predetermined time T1, the processing advances to step S50, and where the timed interval does not exceed the first predetermined time T1, the processing returns to step S10. In this case, the determination criterion of equal to or longer than a first predetermined time T1 is stored in advance in the duty ratio set unit 154 as an interval in which the motor 32 is assumed to have stopped. The first predetermined time T1 can be set e.g., to about several tens of milliseconds. Thus, in step S40, the duty ratio set unit 154 can determine whether the motor 32 has stopped. When the motor 32 is determined to have stopped, the processing advances to step S50.

Figure 7:
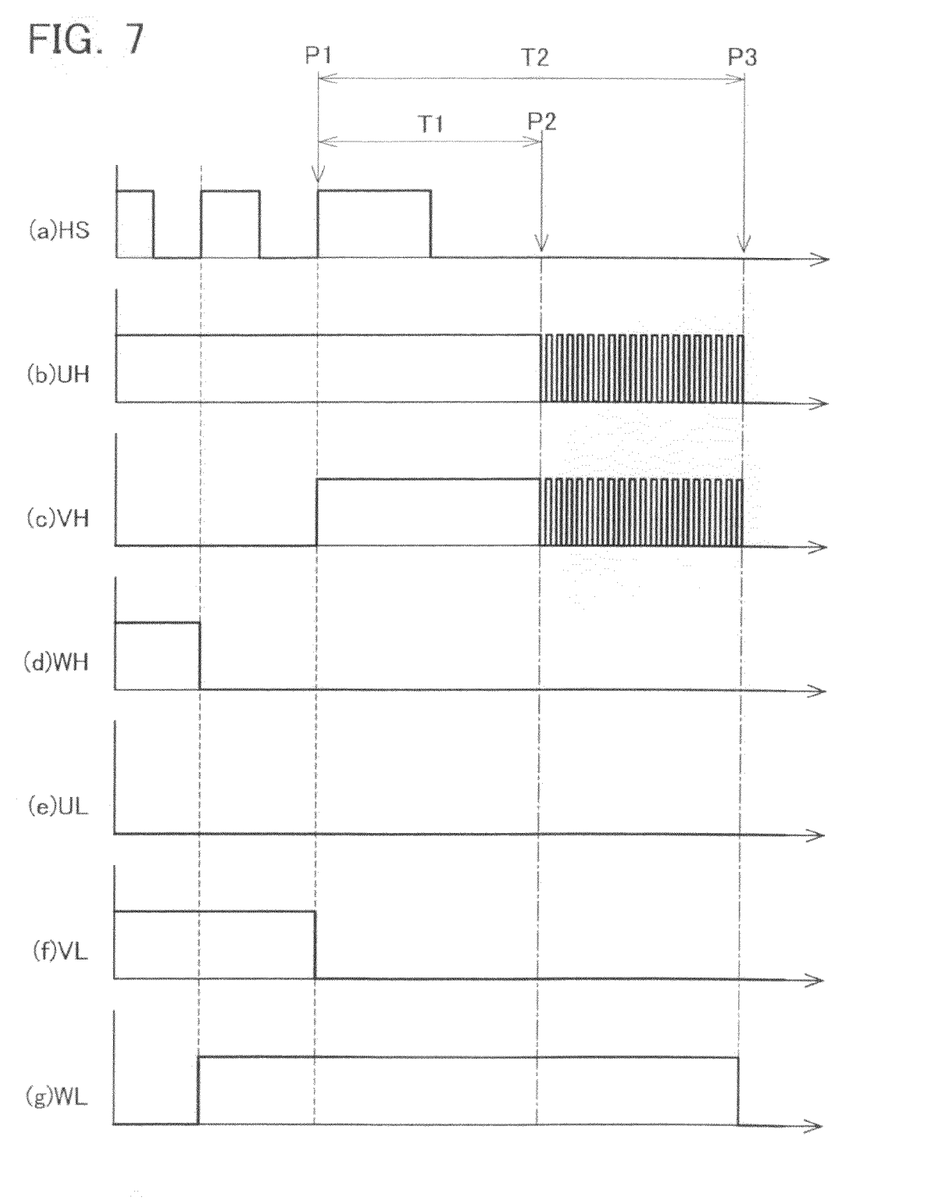
FIG. 7 is a time chart showing an on-signal when the duty ratio is reduced at timing P2 and the motor is stopped at timing P3.

When the processing has advanced to step S50, the duty ratio that has been set to a value equal to or larger than 80 percent is reduced to 70 percent by the duty ratio set unit 154. As a result, as shown in FIG. 7, the on-signals UH, VH, WH to the upper arm switching elements 111 to 113 are changed into a pulse signal row by pulse width modulation. In FIG. 7, timing P1 indicates a timing at which the Hall signal HS was finally updated, and timing P2 indicates a timing at which the first predetermined time T1 has elapsed after the timing P1. A width in which the duty ratio is reduced in the process of step S50 is not limited to 10 percent. Thus, this width may be in a range in which a voltage drop caused by discharge of bootstrap capacitor can be prevented without unnecessarily excessively decreasing the motor output. More specifically, the width may be set to a range of from 10 percent to 50 percent. Further, in an electric tool such as the electric driver 10, the user immediately senses the decrease in motor output. Therefore, the user can be notified about an excessively high load applied to the motor 32 by reducing the duty ratio in the processing of step S50. However, if the duty ratio is excessively reduced, the counterforce from the electric driver 10 abruptly decreases and the user can lose the balance. From these standpoints, it is preferred that the duty ratio reduction width be within a range of from 10 percent to 50 percent.

As shown in FIG. 7, where the motor 32 is locked e.g., by a mechanical lock during the operation at a duty ratio of 100 percent, the upper arm switching elements 111 to 113 (two upper arm switching elements 111 and 112 in the example shown in FIG. 7) will continue to be ON over a long interval. Where such a state is maintained, the bootstrap capacitors 131a to 133a will be continuously discharged and the voltage of bootstrap capacitors 131a to 133a will decrease. Such occurrence of decrease in voltage of bootstrap capacitors 131a to 133a caused by the discharge is not limited to a case in which the duty ratio is set to 100 percent; and it can occur when the duty ratio is set to a comparatively high value of equal to or larger than 80 percent. Where the voltage of the bootstrap capacitors 131a to 133a decreases, a sufficient driving voltage cannot be applied to the upper arm switching elements 111 to 113. In this case, the ON resistance of the upper arm switching elements 111 to 113 rises abruptly and the upper arm switching elements 111 to 113 can be burned by heat generated therein. By contrast, where the duty ratio is reduced at the timing (P2) at which the motor 32 has been determined to have stopped and the upper arm switching elements 111 to 113 are intermittently switched off, the bootstrap capacitors 131a to 133a are charged and the voltage thereof is maintained. As a result, the upper arm switching elements 111 to 113 can be prevented from burning.

Then, in step S60, the duty ratio set unit 154 checks the timed interval by the timer 156. Where the timed interval by the timer 156 is equal to or longer than the first predetermined time T1, the processing advances to step S70, and where the timed interval does not exceed the first predetermined time T1, the processing returns to step S10. In step S70, the duty ratio set unit 154 also checks the timed interval by the timer 156. Where the timed interval by the timer 156 is equal to or longer than the second predetermined time T2, the processing advances to step S80, and where the timed interval does not exceed the second predetermined time T2, the processing returns to step S60. In this case, the second predetermined time T2 is set longer than the first predetermined time T1. By the processing of these steps S60 and S70, the duty ratio set unit 154 determines whether the motor 32 is still stopped or whether the motor 32 has started rotating again.

When the timed interval by the timer 156 becomes equal to or longer than the second predetermined time T2, (YES in the processing of step S70), the motor 32 is determined to be still stopped. In this case, the duty ratio set unit 154 advances to the processing of step S80 and sets the duty ratio to zero percent. As a result, as shown in FIG. 7, the operation of the motor 32 is forcibly ended at the timing P3 at which the second predetermined time T2 has elapsed since the timing P1.

Figure 8:
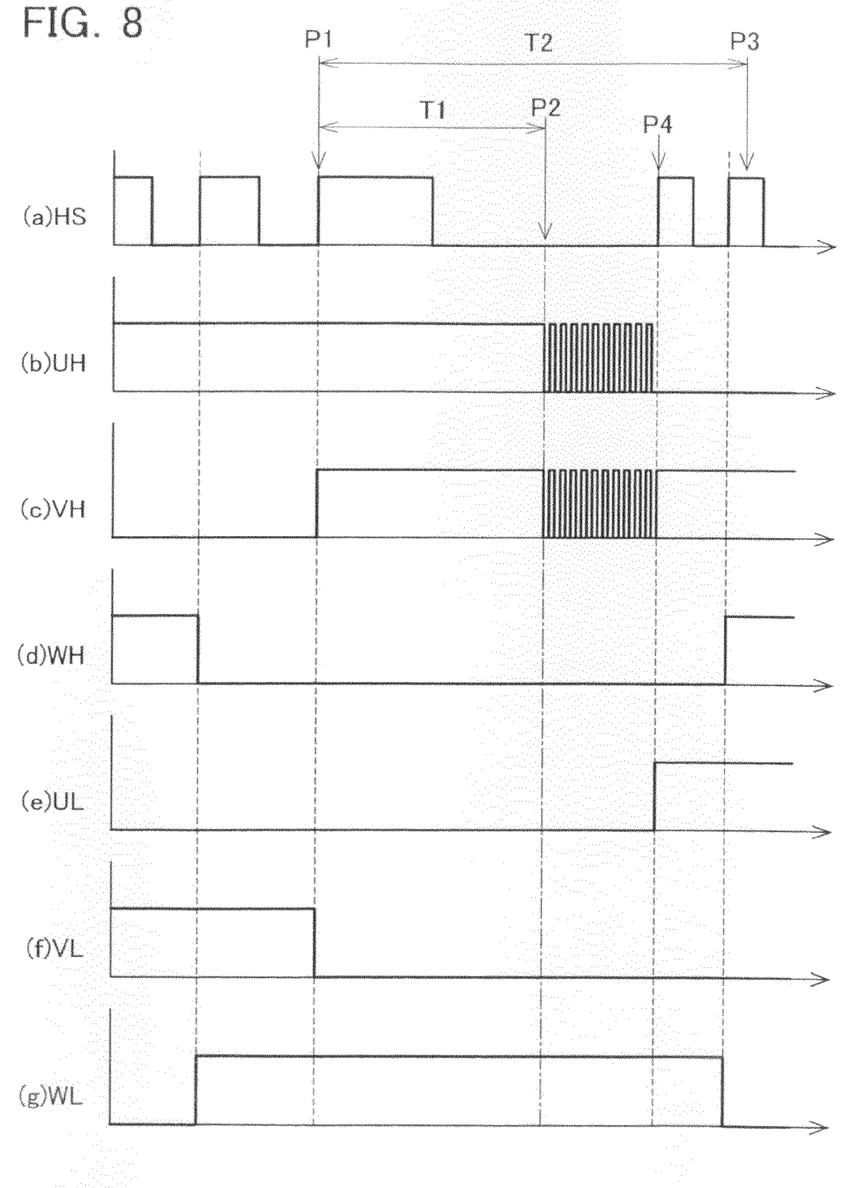
FIG. 8 is a time chart showing an on-signal when the duty ratio is reduced at timing P2 and the duty ratio is reset at timing P4.

When the timed interval by the timer 156 becomes shorter than the first predetermined time T1 (YES in the processing of step S60), the motor 32 is determined to have started rotating again. In this case, the duty ratio set unit 154 returns to the processing of step S10. As a result, as shown in FIG. 8, a duty ratio corresponding to the trigger signal TG is set again at a timing P4 equal to or preceding the timing P3. For example, when the user operates the trigger switch 28 continuously at a maximum, the duty ratio is set again to 100 percent. Where the motor 32 is temporarily locked by overload or the like, the user can continue the job, without operating the trigger switch 28 again.

As described above, with the electric driver 10 of the present embodiment, for example, when the motor 32 is locked by a mechanical lock or overload, the upper arm switching elements 111 to 113 are intermittently switched off even when the trigger switch 28 is operated at a maximum. By intermittently switching off the upper arm switching elements 111 to 113, it is possible to prevent a voltage drop caused by the discharge of bootstrap capacitors 131a to 133a and continuously apply a sufficient driving voltage to the upper arm switching elements 111 to 113. As a result, the upper arm switching elements 111 to 113 can be prevented from burning.

Specific embodiment of the present teachings is described above, but those merely illustrates some representative possibilities for utilizing the teachings and does not restrict the claims thereof. The subject matter set forth in the claims includes variations and modifications of the specific examples set forth above. The technical elements disclosed in the specification or the drawings may be utilized separately or in all types of combinations, and are not limited to the combinations set forth in the claims at the time of filing of the application. Furthermore, the subject matter disclosed herein may be utilized to simultaneously achieve a plurality of objects or to only achieve one object.

The invention claimed is:
1. A motor controller, comprising:
a position sensor detecting a rotational position of a motor;
an upper arm switching element comprising a gate to be driven and configured to connect and disconnect a corresponding terminal of the motor and a positive electrode of a DC power supply;
a lower arm switching element comprising a gate to be driven and configured to connect and disconnect the corresponding terminal of the motor and a negative electrode of the DC power supply;
a processor selectively outputting an on-signal to either one of the upper arm switching element and the lower arm switching element based upon a detected position by the position sensor,
an upper arm gate driver inputting a driving voltage to the gate of the upper arm switching element by shifting a level of the on-signal from the processor to the upper arm switching element;
a lower arm gate driver inputting a driving voltage to the gate of the lower arm switching element by shifting a level of the on-signal from the processor to the lower arm switching element; and
a bootstrap capacitor configured to be charged while the upper arm switching element is turned off and to behave as a voltage supply for the upper arm gate driver while the upper arm switching element is turned on,
wherein the processor comprises:
a setting process portion setting a duty ratio based upon a target speed of rotation of the motor;
a PWM process portion modulating width of the on-signal based upon the set duty ratio; and
a timer process portion timing an interval of update of the detected position by the position sensor,
wherein the setting process portion is configured to reduce the set duty ratio when the set duty ratio is equal to or larger than a predetermined value and the timed interval by the timer process portion exceeds a first predetermined time.
2. The motor controller as in claim 1, wherein the setting process portion is configured to reduce the set duty ratio when the set duty ratio is equal to or larger than 80 percent and the timed interval by the timer process portion exceeds the first predetermined time.

3. The motor controller as in claim 1, wherein the setting process portion is configured to reduce the set duty ratio by an amount between 10 to 50 percent in reducing the set duty ratio.

4. The motor controller as in claim 1, wherein the setting process portion is configured to reset the duty ratio based upon the target speed of rotation of the motor when the timed interval by the timer process portion becomes shorter than the first predetermined time after having reduced the set duty ratio.

5. The motor controller as in claim 1, wherein the setting process portion is configured to re-reduce the duty ratio to zero percent when the timed interval by the timer process portion exceeds a second predetermined time, which is longer than the first predetermined time, after having reduced the set duty ratio.

6. The motor controller as in claim 1, wherein the setting process portion is configured to reduce the set duty ratio by an amount between 10 to 50 percent when the set duty ratio is equal to or larger than 80 percent and the timed interval by the timer process portion exceeds the first predetermined time.

7. The motor controller as in claim 1, wherein the setting process portion is configured to:
   reset the duty ratio based upon the target speed of rotation of the motor when the timed interval by the timer process portion becomes shorter than the first predetermined time after having reduced the set duty ratio; and
   re-reduce the duty ratio to zero percent when the timed interval by the timer process portion exceeds a second predetermined time, which is longer than the first predetermined time, after having reduced the set duty ratio.

8. The motor controller as in claim 1, wherein the setting process portion is configured to:
   reduce the set duty ratio by an amount between 10 to 50 percent when the set duty ratio is equal to or larger than 80 percent and the timed interval by the timer process portion exceeds the first predetermined time;
   reset the duty ratio based upon the target speed of rotation of the motor when the timed interval by the timer process portion becomes shorter than the first predetermined time after having reduced the set duty ratio; and
   re-reduce the duty ratio to zero percent when the timed interval by the timer process portion exceeds a second predetermined time, which is longer than the first predetermined time, after having reduced the set duty ratio.

9. An electric tool, comprising:
   a motor driving a tool member; and
   the motor controller as in claim 1 and controlling the motor.

\* \* \* \* \*